United States Patent [19]
Roll et al.

[11] Patent Number: 5,344,220
[45] Date of Patent: Sep. 6, 1994

[54] ANTI-LOCK CONTROL SYSTEM FOR MOTORCYCLES

[75] Inventors: Georg Roll, Heusenstamm; Heinz F. Ohm, Weiderstadt; Berthold Hauser, Jakobsneuharting, all of Fed. Rep. of Germany

[73] Assignees: FAG Kugelfischer Georg Schafer Kommanditgesellschaft auf Aktien; Bayerische Motorenwerke AG, Fed. Rep. of Germany

[21] Appl. No.: 16,748

[22] Filed: Feb. 11, 1993

[30] Foreign Application Priority Data

Feb. 14, 1992 [DE] Fed. Rep. of Germany ....... 4204350

[51] Int. Cl.$^5$ ............................................. B60T 8/28
[52] U.S. Cl. ..................... 303/9.64; 303/9.73; 303/113.5
[58] Field of Search ............. 303/9.62, 9.64, 9.67, 303/9.68, 9.73, 24.1, DIG. 1, DIG. 4, 94–97, 99, 100, 102, 103, 113.5

[56] References Cited

U.S. PATENT DOCUMENTS

| | | | |
|---|---|---|---|
| 4,755,946 | 7/1988 | Lin | 303/DIG. 4 |
| 4,881,784 | 11/1989 | Leppek | 303/DIG. 4 |

FOREIGN PATENT DOCUMENTS

| | | | |
|---|---|---|---|
| 443066 | 8/1991 | European Pat. Off. | 303/DIG. 4 |
| 8743 | 1/1981 | Japan | 303/DIG. 4 |

Primary Examiner—Robert J. Oberleitner
Assistant Examiner—Alfred Muratori
Attorney, Agent, or Firm—Ostrolenk, Faber, Gerb & Soffen

[57] ABSTRACT

An anti-lock system for motorcycles which includes a monitoring circuit (3) and an overbraking preventer (4) which compares the front-wheel brake pressure continuously during the reloading phases with a pressure reference threshold and if the threshold is exceeded, with simultaneous exceeding of a high vehicle deceleration threshold, transmits a control signal to the monitoring circuit (3). The control signal results in the pressure modulator (1) only very slowly increasing the front wheel brake pressure.

5 Claims, 6 Drawing Sheets

ANTI-LOCK CONTROL SYSTEM FOR MOTORCYCLES

BACKGROUND OF THE INVENTION

The present invention relates to an anti-lock control system for motorcycles.

Motorcycles with soft front-wheel suspension tend to considerable jittering of the front axle fork upon anti-lock controlled braking on a surface of good adherence since every relief of pressure caused by overbraking leads to a springing out of the fork and thus to a loss of front-wheel ground-contact force, which, in its turn, makes a stronger relief of pressure with further springing out necessary (feedback effect).

This effect makes itself particularly noticeable in the lower speed range where, due to the critical slip-curve conditions, stronger pressure modulations are generally already necessary in order to compensate for wheel-locking tendencies.

In this way, longer brake paths and a lack of comfort control result.

SUMMARY OF THE INVENTION

The object of the invention is therefore to provide an anti-lock control system for motorcycles which avoids the above-mentioned disadvantages and, with optimal brake path and good control of comfort, prevents frequent declines in wheel speed during a controlled braking.

This object is achieved in accordance with the present invention by an anti-lock system which recognizes when the vehicle which has been braked in controlled manner is already operating close to the optimal deceleration point. In this case, the pressure modulator is caused to increase the braking pressure on the front wheel by only small amounts so that the front wheel no longer shows any tendency to lock, particularly in the lower speed range, and strong pressure modulations are no longer necessary.

Other features and advantages of the present invention will become apparent from the following description of the invention which refers to the accompanying drawings.

BRIEF DESCRIPTION OF THE DRAWING(S)

Figure 1:
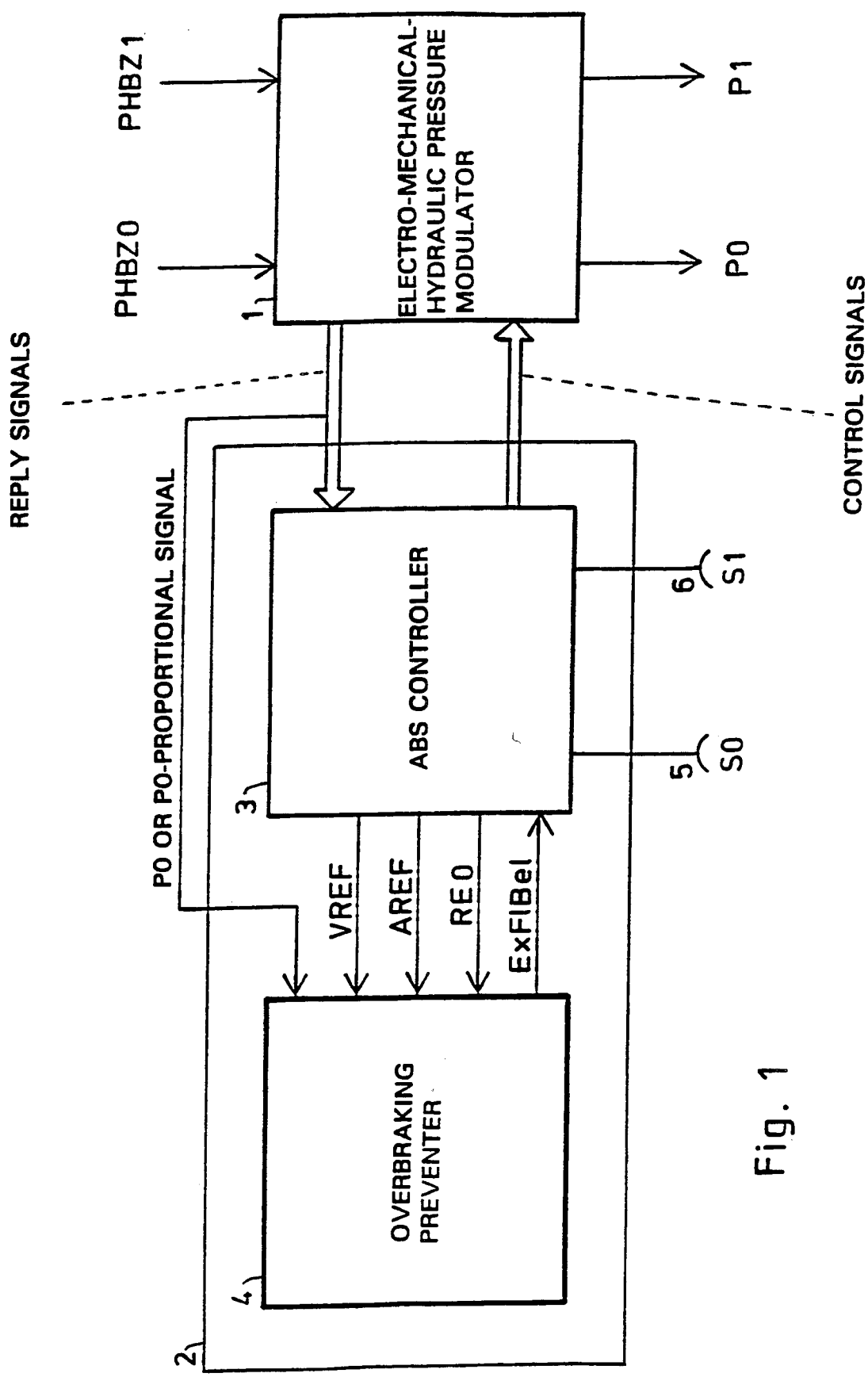
FIG. 1 is a block diagram of the anti-lock system.

In this connection, the variables and constants are as follows:

S0 = signal of the inductive front-wheel sensor which permits a determination of the actual front-wheel circumferential speed S1 = signal from the inductive rear-wheel sensor which permits a determination of the actual rear-wheel circumferential speed V0 = front-wheel instantaneous speed (an ABS controller forms the instantaneous wheel circumferential speed from the wheel-sensor signals in each control cycle)

V1 = rear-wheel instantaneous speed

VF = actual speed of the vehicle (not known to the ABS controller)

P0 = wheel brake-cylinder pressure on the front wheel (this pressure is set upon the control braking by the ABS controller; the mechanisms shown here can indirectly affect P0 via the ABS controller)

P0on = value of P0 at which the front wheel shows locking tendencies $P0on\_i$ = value of P0 at which the front wheel speed declines for the $i^{th}$ time during a control braking DeltaP0 = amount of the front-wheel pressure modulation which is necessary in order to eliminate a front-wheel locking tendency $DeltaP0\_i$ = Delta P0 on the $i^{th}$ front-wheel speed decline during a control braking P1 = wheel brake-cylinder pressure on the rear wheel PHBZ0 = main brake-cylinder pressure of the front wheel channel PHBZ1 = main brake cylinder pressure of the rear wheel channel VREF = calculated vehicle reference speed (is formed from filtered wheel speeds and plausibility considerations)

AREF = filtered vehicle reference deceleration (derivative with respect to time of VREF which, due to the short control cycle times, varies to be sure very greatly. For this reason a filtering of this signal is generally effected. AREF is assumed as such a filtered vehicle deceleration.)

AREFMin = minimum vehicle reference deceleration which must be exceeded in order for the flat loading ramp to be activated ExFlBel = control signal on the ABS controller, effects an extremely flat pressure reloading on the front wheel T0ExFlBel = time when the front wheel brake pressure within the control is increased only with extremely flat gradient RE0 = indicating signal for a wheel overbraking (Boolean 1-bit signal which lies on logical "1" when an unstable slippage is present on the front wheel)

VS0 = speed threshold for the front wheel (if V0 drops below VS0, the ABS controller recognizes a tendency towards locking of the front wheel)

T0on = time when a wheel speed decline caused by over-braking is recognized $T0on\_i$ = time when a wheel speed decline caused by over-braking is recognized for the $i^{th}$ time within a control braking T0off = time when a wheel speed decline has been compensated for $T0off\_i$ = time when a wheel speed decline has been compensated for the ith time during a control braking P0Ref = reference value for the front-wheel pressure upon the exceeding of which the mechanism described here may be activated C1,C2,D1 = spring constants and damping constants of the motorcycle front-wheel fork $FVRA\_0$, $FVRA\_1$ = front wheel ground contact force for different conditions of braking FB = braking force FT = mass force of inertia Pconst=constant pressure amount
K1,K2,K3=constants for function AREFMin=f(-VREF)
1 g=acceleration due to gravity=9.81 m/s$^2$

DETAILED DESCRIPTION OF THE INVENTION

FIG. 1 shows a block diagram of an anti-lock system consisting of a hydraulic-electric-mechanical pressure modulator (1) and an electronic control unit (2) which, in addition to the monitoring circuit (3) for the ABS controller, also contains an overbraking preventer (4). These function blocks (3,4) can be formed both by special hardware and by a software implementation.

In order to represent the inclusion of the overbraking preventer (4) in a normal anti-lock system, the functional relationships of the blocks (1,3,4) will be briefly described below. The monitoring circuit (3) receives, from the inductive wheel sensors (5,6), trains of pulses S0 and S1 from the frequency of which it directly calculates the real circumferential speeds V0 and V1 of the two wheels of the motorcycle. From V0 and V1, the monitoring circuit determines further internal reference signals, such as, for instance, the vehicle reference speed VREF and the vehicle reference deceleration AREF, so that it can recognize and dependently compensate for overbraking conditions. In the event of the occurrence thereof, the monitoring circuit (3) delivers pressure control signals to the pressure modulator (1), so that the latter reduces the main brake-cylinder pressures PHBZ0 and PHBZ1 which have been determined by the driver and transmits them as wheel brake-cylinder pressures P0 and P1 to the two wheel brake circuits. The pressure modulator taken as basis here gives return signals to the monitoring circuit (3); there is concerned here information as to the brake pressures P0 and P1 set and therefore, in the event of a plunger pressure modulator (for instance, in accordance with German OS 35 30 280), the pressure-determining positions of the plungers.

The internal reference signals can also be used by the overbraking preventer (4). Methods and apparatus which regulate braking and which are engagable with the overbraking preventer are disclosed in copending applications, U.S. Ser. No. 07/962,890, filed Oct. 19, 1992 and entitled "Method and Apparatus for Regulating the Braking Force of Motorcycles" and U.S. Ser. No. 08/002,844, filed Jan. 11, 1993, entitled "Method of Regulating The Braking Force of Motorcycles" and filed in the names of the same inventors as the present application. The entire disclosures of both copending applications are incorporated by reference herein.

The overbraking preventer (4), on the basis of these signals, recognizes whether, assuming that uniform road conditions are present, a further speed decline is about to take place on the front wheel and reports this to the monitoring circuit (3) in the pressure reloading phase by a signal ExFlBel which causes the pressure modulator to increase the pressure on the front wheel still only with a minimum gradient.

The monitoring circuit (3) and the overbraking preventer (4) therefore operate in parallel: When an overbraking situation occurs, the monitoring circuit (3) assumes the control and regulates the braking pressures by corresponding control of the pressure modulator (1). In the event that, with extensive deceleration of the vehicle, a front wheel speed decline is soon to be expected, the overbraking preventer (4) assumes the control and controls the monitoring circuit for the ABS controller.

In accordance with the control strategy customarily employed, anti-lock systems carry out a cyclic switching between three different pressure modulation phases. Whenever the wheel in question is overbraked for a short time and then tends to lock, which generally is recognized from a steep running-in of the wheel circumferential speed in large slippage regions (in the following also referred to as wheel-speed decline or overbraking), the pressure reduction phase commences. It terminates when the wheel again accelerates and a pressure halt phase commences. After the wheel has again come into small (stable) slippage regions, a pressure build-up phase commences (reloading phase), until a new wheel speed decline again introduces a pressure reduction phase.

The cyclically constantly attempted overbraking provocation is intended to assure that the brake pressure set never lies too far from the maximum stable adjustable pressure point, and therefore that no strong underbraking effects can occur. The disadvantage of these declines which, in the case of homogeneous ground conditions take place about every 500 ms, lies in the unquiet control which is produced by the large pressure modulations necessary. The amount of the modulations is greater the more pronounced the maximum of the $\mu$-slippage curve.

Motorcycles with soft front-wheel suspension and low flexural stiffness of the front wheel fork exhibit an additional problem.

Figure 2:
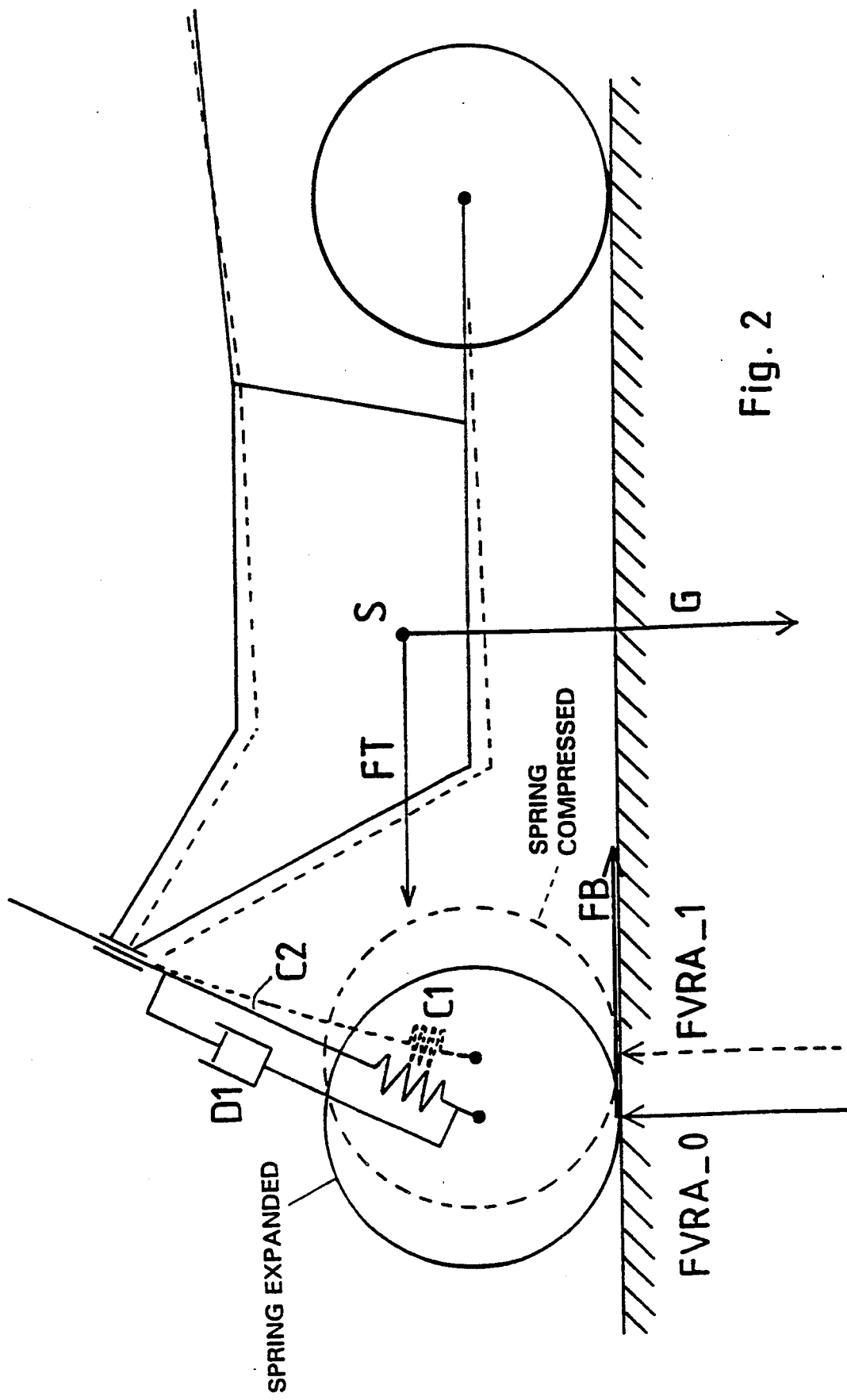
FIG. 2 shows the movement of the front-wheel fork upon strong modulation of brake pressure.

FIG. 2 shows, in greatly simplified form, the springing in and out of the fork. Upon the build-up of the front-wheel pressure during braking, the vehicle first of all springs inward in dampened manner (compression spring of spring constant C1 is compressed).

At the same time, the front wheel fork, due to its finite flexural stiffness C2, bends inward since the relatively high mass inertia force FT of the entire motorcycle acts on the fork.

The further the fork bends inward, the greater, therefore, the ground contact force (FAVR_1>FAVR_0) since the front wheel contact point comes closer to the center of gravity (S).

Due to the deceleration-induced moment of rotation around the center of gravity, practically the entire weight of the vehicle shifts onto the front wheel in the case of strong braking. As a result, very high braking moments can then act on the front wheel without the wheel locking.

However, if the pressure exceeds the locking point so that the anti-lock system brings about a reduction in pressure, the bending force acting on the fork from the ground suddenly also decreases.

Due to its small mass, the fork now rapidly springs forward, the damping D1 of the pressure of the compression spring having the result that, at least for a short time, the front wheel loses more ground contact force than would be expected on the basis of the only relatively slight shift in the point of contact. Due to the loss of ground contact force, the force FB acting in driving manner from the ground suddenly decreases and, as a result of the high wheel brake moment which has previously built up, a strong tendency towards wheel locking results, which can be compensated for only by a strong reduction in brake pressure.

This effect makes itself particularly noticeable in the lower speed range where, due to the critical slip-curve conditions, stronger pressure modulations are generally already necessary in order to compensate for declines in wheel speed.

Figure 3:
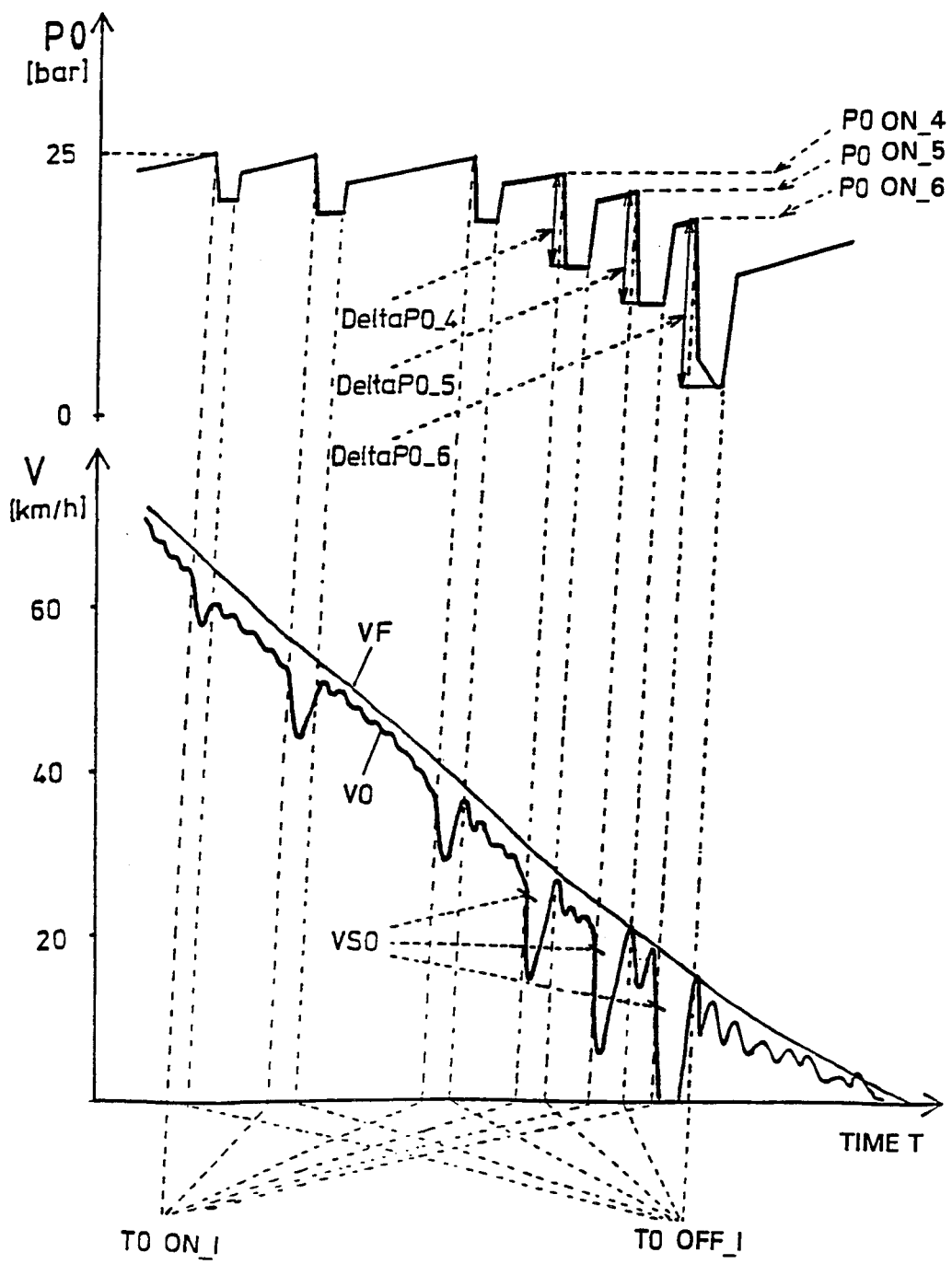
FIG. 3 is a time graph of a controlled braking without overbraking preventer (excitation of wheel jitter upon strong brake pressure modulation)

FIG. 3 shows the time graph of a poor control braking of a motorcycle with soft front wheel suspension on ground of good adherence. The unrest of the front wheel (recognizable from the jitter) increases greatly at the end of the braking. While at higher speeds, relatively small pressure modulations DeltaP0 still lead to a compensation for the slippage of the wheel, in the lower speed range modulations which lead to strong front-wheel springing and cause extreme swingings on the front wheel fork are necessary. In order that the ABS controller does not misinterpret such swingings as renewed signs of locking, the recognition threshold for states of locking must be set lower, for instance, at smaller speeds or when real jitter is recognized (see VSO in FIG. 3).

This has the disadvantage that an actual wheel locking is also recognized later, so that the wheel then already has exceeded with high dynamics the μ-slippage curve maximum and makes a correspondingly rapid and large pressure modulation necessary:

DeltaP0_6 > DeltaP0_5 > DeltaP0_4, etc.

The steep increase in pressure after the overbraking compensation, for instance after T0off_5, is necessary in order that braking is not effected too long with excessively small pressure values. Since the wheel, however, immediately again tends towards locking due to swingings and variations in the ground contact force, the brake pressure level on the front wheel and the deceleration of the vehicle obtained decrease continuously:

P0on_6 < P0on_5 < P0on_4, etc.

After T0off_6, despite the pressure increase, there is finally reached such a low pressure point that no further locking takes place any longer and the braking terminates with a front wheel the swinging of which fades away.

In order, as far as possible, completely to avoid these strong pressure modulations, which always act to reduce the comfort and lengthen the braking path in the lower speed range on the front wheel, the invention provides special measures for a weaker pressure reloading on the front wheel.

For this, an overbraking preventer (4) notes the front wheel brake pressure at which the front wheel shows a tendency towards locking.

This is done either by a pressure value transmitter or, in the event of the use of a plunger pressure modulator, by measuring the plunger setting at the time of the tendency towards the locking of the wheel. If the reloading ramp has again approximately reached this noted point and the vehicle deceleration is sufficiently great (>0.8 g), the ramp has an extremely flat slope. This has the result that, during the last phase of the braking, the tire can properly mesh with the ground, which, on the one hand, leads to extremely high decelerations and, on the other hand, avoids, among other things, any further wheel decline in the final phase.

In the case of this measure, the fact is utilized that, in the event of a deceleration which is already very high, one can no longer count on a large increase in the deceleration, since 1 g is approximately the maximum attainable.

One meaningful extension of the measure consists now in effecting the flat pressure rise also already at high speeds of the vehicle if a corresponding deceleration of the vehicle has been reached.

For high speeds, however, a higher deceleration must be required since the air resistance, particularly in the case of a motorcycle, leads further to an additional decelerating force.

Figure 4:
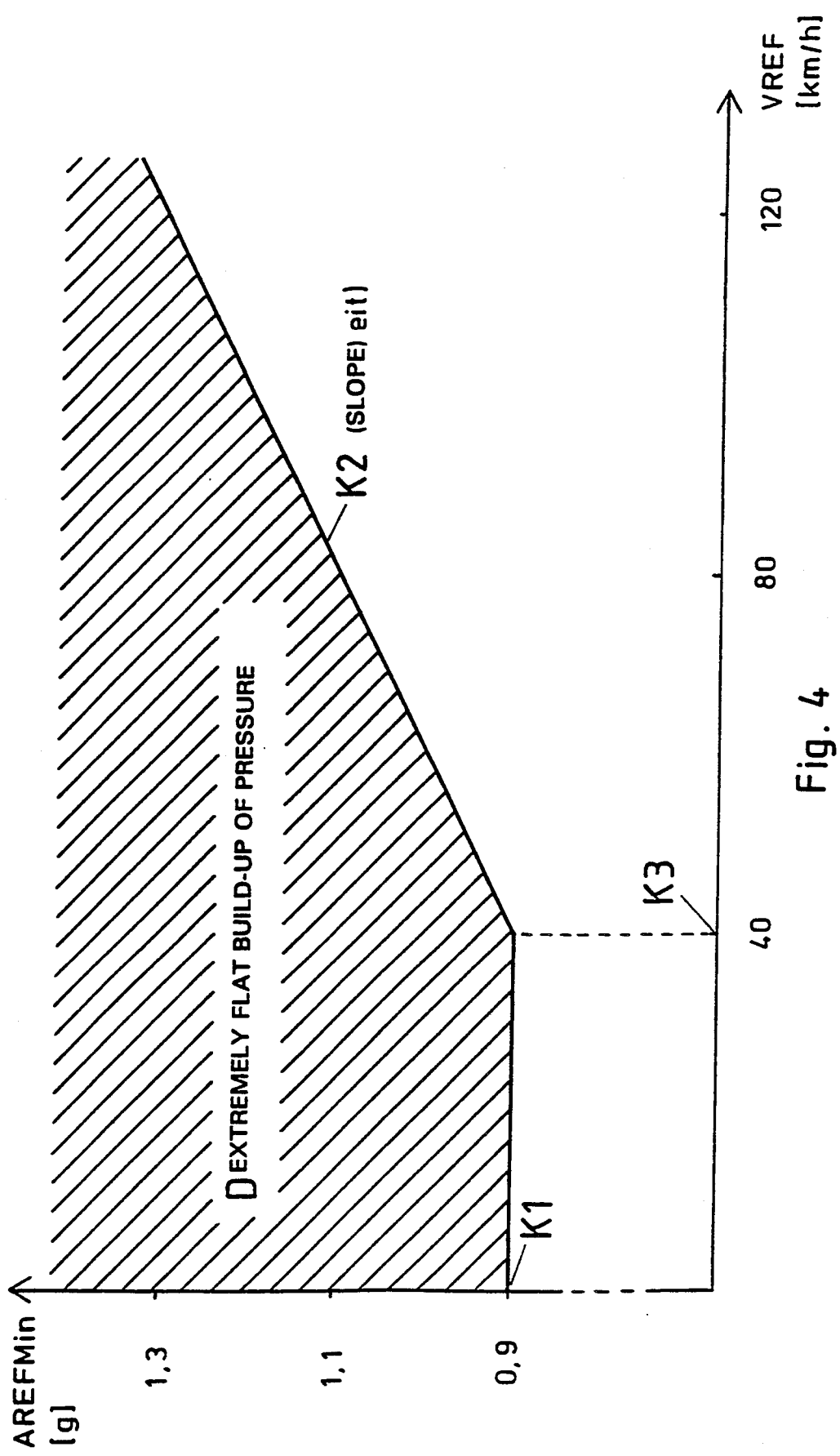
FIG. 4 shows the function f (VREF) for the extremely flat pressure ramp.

FIG. 4 shows this deceleration threshold AREFMin as function of the reference speed of the vehicle VREF:

AREFMin = K1 for VREF < = K3
AREFMin = K1 + K2*(VREF − K3) for VREF > K3 with (for instance):

K1 = 0.9 g
K2 = 0.1 g/20 km/hr
K3 = 40 km/hr

The constants K1, K2 and K3 must be adapted to the specific type of motorcycle, in which connection the tires used are predominantly relevant.

If, upon a braking in the still higher speed range, declines in the front wheel speed occur despite the slow increase in pressure, they do not have a very negative effect, and the braking process remains rather uniform for the driver despite the pressure modulations.

If, however, declines are to be prevented in this region, very large deceleration values with the motorcycle traveling entirely quietly can be obtained. There is no danger of underbraking since, after all, very high values of the vehicle reference deceleration are required, which are also adapted to the corresponding speed values.

Furthermore, one can proceed from the basis that a driver, in the case of these deceleration values, will already have difficulty in keeping the vehicle in stable manner on the track. Depending on the type of vehicle, swaying effects or lifting processes already occur.

In view of the need for a very high deceleration of the vehicle, the mechanism enters into action only upon braking on extremely good gripping ground. In the case of wet or slippery ground, the normal reloading algorithm takes place, so that then, of course, also a cyclic overbraking of the front wheel with corresponding declines in speed is desired.

Figure 5:
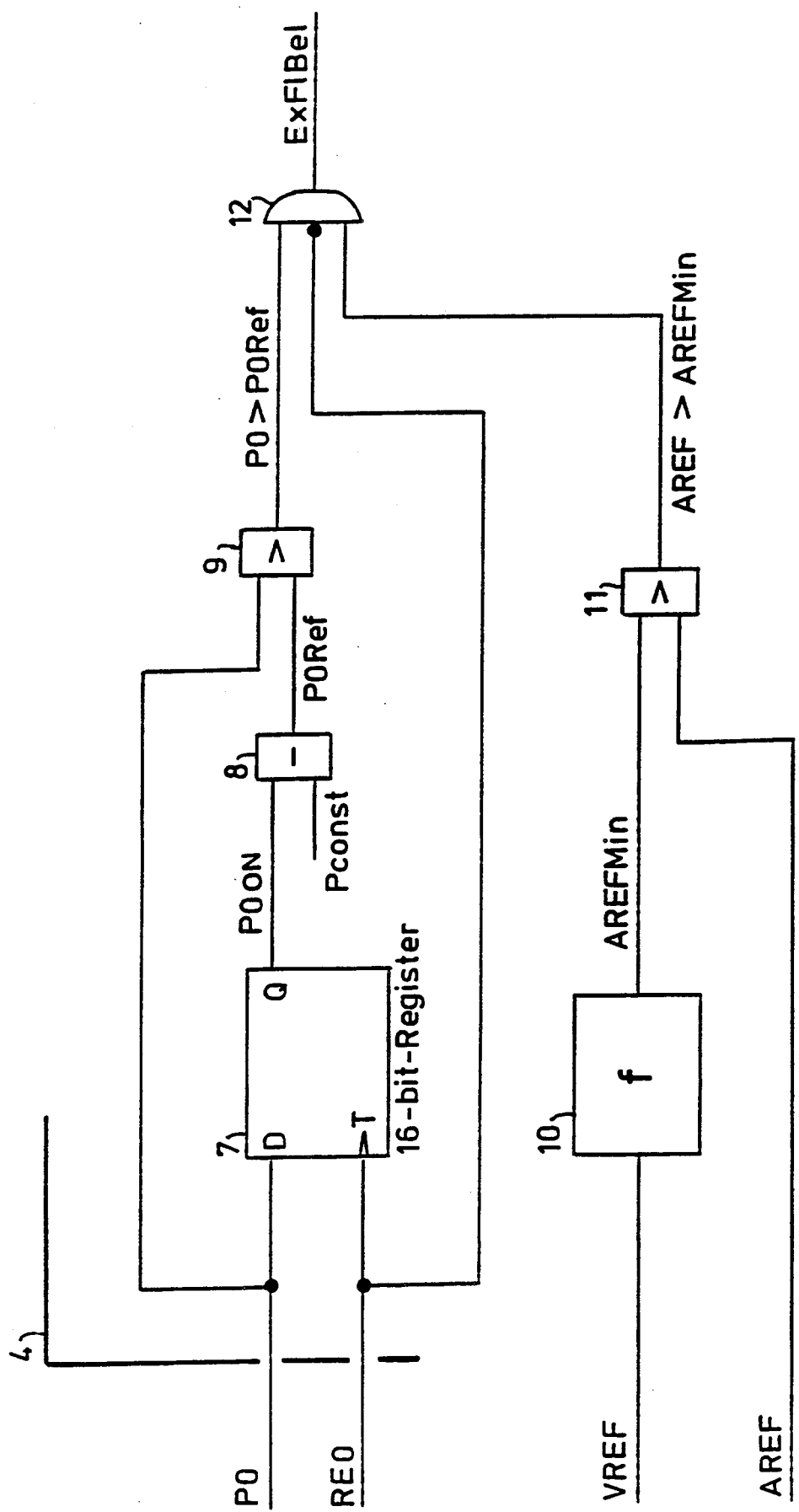
FIG. 5 is a circuit diagram of the overbraking preventer.

FIG. 5 shows an embodiment in accordance with the invention.

When a wheel speed decline is imminent, the monitoring circuit (3) recognizes this and sets the signal RE0 from logical "0" to "1". This signal causes the 16-bit register (7) to store the existing brake pressure on the front wheel P0 as decline brake pressure P0on. In the event of a plunger modulator, the position of the front-wheel piston can also be noted instead of P0on.

Via the subtractor (8) a small Pconst is further deducted from this stored value P0on. The difference is fed as reference signal P0Ref to a comparator (9) and continuously compared with the actual front wheel brake pressure P0. When P0 exceeds the reference value P0Ref and therefore lies close to the decline pressure point P0on, the comparator (9) switches a logical "1" to the AND gate (12).

At the same time, the function generator (10) shown in FIG. 4 produces a deceleration threshold value AREFMin as a function of the vehicle reference speed VREF reached. It is fed to the comparator (11) and compared with the vehicle reference delay AREF determined by the ABS controller. If AREF exceeds the threshold AREFMin, the comparator (11) switches a logical "1" to the AND gate (12). This then sets its output precisely to logical "1" when P0 exceeds the threshold P0Ref, AREF exceeds the AREFMin and the ABS control operates just in the reloading phase the RE0 for indication of a still existing front wheel speed reduction is logical "0".

A "1" at the output of the AND gate (12) means that the overbraking preventer (4) of the monitoring circuit (3) indicates by the signal ExFlBel that the normal pressure start has terminated and the pressure may now still be increased still only with an extremely flat ramp.

Figure 6:
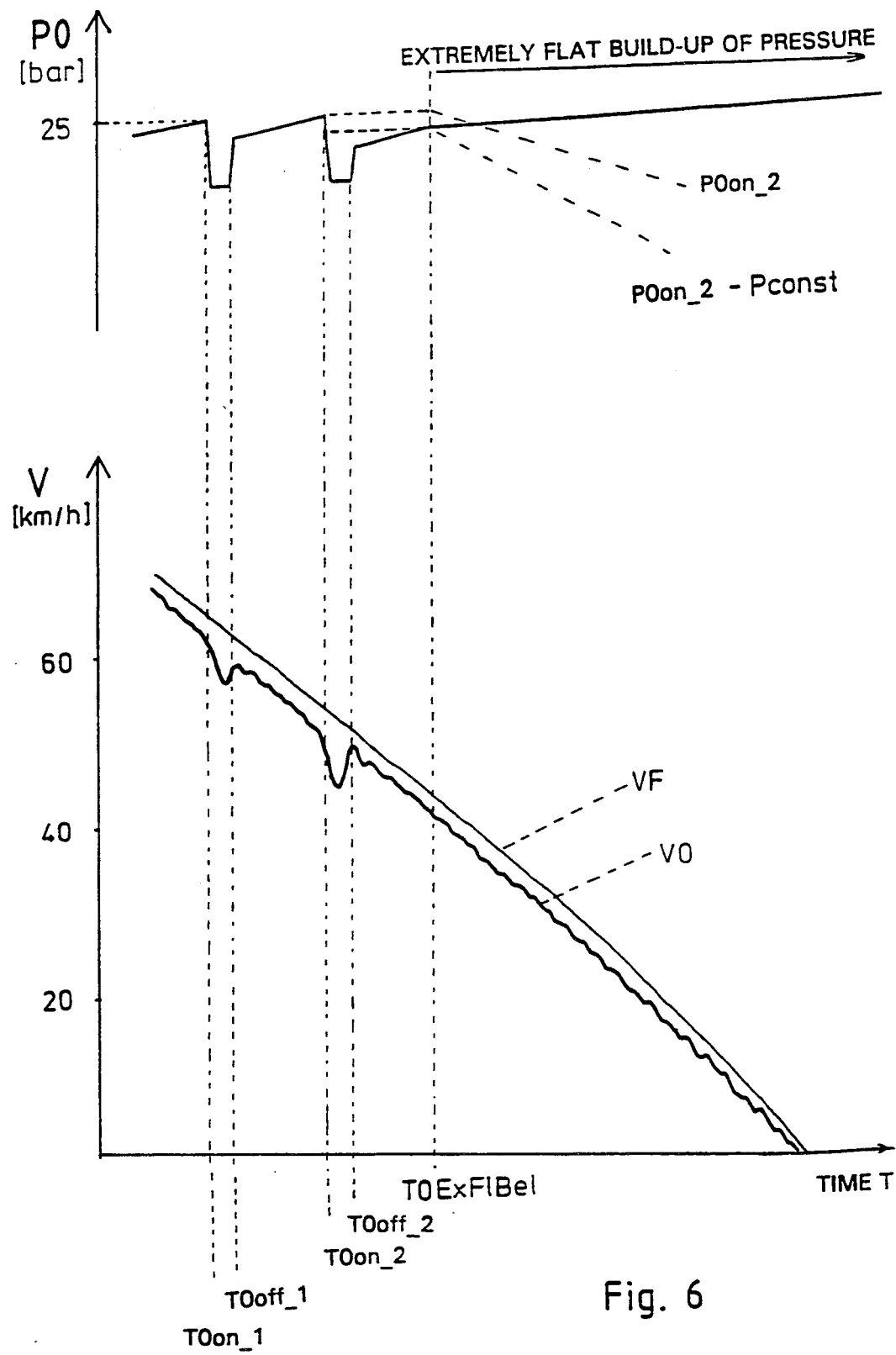
FIG. 6 is a time graph of braking with overbraking preventer.

The time graph of FIG. 6 shows the effect of the method described. While the braking pressure on the front wheel still rises only very slightly, the front wheel speed becomes very quiet and no further tendency towards locking occurs.

The slight wheel jitter indicates here that the slippage is in the vicinity of the optimum value with the μ-maximum. This deceleration assumes, at the end of the braking, peak values which would not be obtainable with a rapid reloading.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An anti-lock system for motorcycles, which comprises:

means for sensing respective speeds of the front and rear wheels of the motorcycle;

means for applying braking pressure to the front wheel at a first rate;

means responsive to the sensing means for determining deceleration of the motorcycle;

means for comparing the pressure applied to the front wheel with a predetermined pressure reference threshold and, if said threshold is exceeded, along with simultaneous exceeding of a predetermine motorcycle deceleration limit, for generating a control signal to the brake pressure applying means for increasing the pressure applied to the front wheel at a second rate lower than the first rate.

2. An anti-lock system in accordance with claim 1, including means for storing the wheel brake pressure upon the occurrence of a first tendency towards locking and for generating the pressure reference threshold by reducing said stored brake pressure by a predetermined amount.

3. An anti-lock system in accordance with claim 1, including means for generating the motorcycle deceleration limit, said means including means for adding a first fixed value to a second value dependent upon the speed of the motorcycle.

4. An anti-lock system in accordance with claim 3, wherein the first fixed value is a function of certain motorcycle characteristics.

5. An anti-lock system in accordance with claim 3, wherein the first fixed value is 0.9 g.

* * * * *